(12) United States Patent
Nichols et al.

(10) Patent No.: US 8,220,115 B2
(45) Date of Patent: Jul. 17, 2012

(54) HOLDER FOR HANDPIECE DEVICES

(76) Inventors: Jack R. Nichols, American Fork, UT (US); Douglas Beattie, Jr., South Jordan, UT (US); Zhaohui Lin, Salt Lake City, UT (US); Densen Cao, Sandy, UT (US)

(*) Notice: Subject to any disclaimer, the term of this patent is extended or adjusted under 35 U.S.C. 154(b) by 426 days.

(21) Appl. No.: 12/384,333

(22) Filed: Apr. 1, 2009

(65) Prior Publication Data

US 2010/0251522 A1 Oct. 7, 2010

(51) Int. Cl.
*A47G 29/08* (2006.01)
(52) U.S. Cl. ......... 24/458; 24/369; 24/457; 248/225.21; 248/349.1
(58) Field of Classification Search ............. 24/369, 24/378.1, 456–458; 248/222.12, 222.52, 248/225.21, 346.04, 349.1; 269/97.9
See application file for complete search history.

(56) References Cited

U.S. PATENT DOCUMENTS

| | | | | |
|---|---|---|---|---|
| 3,118,207 A * | 1/1964 | Breslow | .......................... | 24/304 |
| 3,153,975 A * | 10/1964 | Rapata | .......................... | 24/295 |
| 3,672,059 A | 6/1972 | Booth | | |
| 5,236,240 A * | 8/1993 | Burns et al. | .................. | 296/97.9 |
| D381,421 S | 7/1997 | Casica et al. | | |
| 5,794,901 A * | 8/1998 | Sigel | .......................... | 248/221.11 |
| 5,899,418 A * | 5/1999 | Khokhar | .......................... | 248/73 |
| 6,003,928 A * | 12/1999 | Curtindale | .................. | 296/97.9 |
| 6,234,558 B1 * | 5/2001 | Curtindale | .................. | 296/97.9 |
| 6,398,179 B1 * | 6/2002 | Soles | .......................... | 248/617 |
| 6,463,946 B1 * | 10/2002 | Wu | .......................... | 135/16 |
| 6,637,707 B1 * | 10/2003 | Gates et al. | ............... | 248/224.7 |
| 6,817,583 B2 * | 11/2004 | Wilson | ...................... | 248/231.9 |
| 6,997,512 B1 * | 2/2006 | Yu | .......................... | 297/344.26 |
| 7,001,128 B2 * | 2/2006 | Kuntze | .......................... | 411/508 |
| 2002/0017800 A1 * | 2/2002 | Ichikawa et al. | ............. | 296/97.9 |
| 2004/0051338 A1 * | 3/2004 | Wilson | .......................... | 296/97.9 |
| 2005/0194509 A1 * | 9/2005 | Tsai et al. | ................. | 248/349.1 |
| 2008/0301915 A1 * | 12/2008 | Lesecq et al. | .................. | 24/457 |
| 2009/0279320 A1 * | 11/2009 | Yokota et al. | ................. | 362/551 |
| 2010/0146747 A1 * | 6/2010 | Reznar et al. | .................. | 24/457 |

* cited by examiner

*Primary Examiner* — Robert J Sandy
*Assistant Examiner* — Tyler Johnson

(57) ABSTRACT

A handpiece holder, which provides easy access to a medical, dental, or industrial handpiece, is replaceable and rotatable to hold handpieces in different angled positions.

6 Claims, 3 Drawing Sheets

HOLDER FOR HANDPIECE DEVICES

BACKGROUND OF THE INVENTION

1. Field

This invention pertains to holders for handpieces used with various medical, dental, and industrial devices. In particular it relates to a handpiece holder, which provides easy access to the handpiece, is replaceable, and rotatable to hold the handpiece in different positions on a vertical support surface.

2. State of the Art

Various holders for handpiece devices, particularly in the medical, dental, and industrial industries, are known. For example, Casica et al., U.S. Pat. No. Des. 381,421, issued Jul. 22, 1997 discloses a surgical handpiece holder for medical devices. Booth, U.S. Pat. No. 3,672,059, issued Jun. 27, 1972, discloses a holder for dental hand pieces. These handpiece holders have different features dependent upon the needs of a user. Desirable features for a handpiece holder are: 1). Easy to access the handpiece, 2) Rotatable to hold the handpiece in different positions, and 3) Replaceable on the field. The invention described below provides a handpiece holder with all of these desirable features.

SUMMARY OF THE INVENTION

The invention comprises a handpiece holder, which provides easy access to the handpiece, is replaceable, and rotatable to hold the handpiece in different rotational positions. Specifically, it comprises a base with means to affix the base to a vertical support surface, such as a wall or the housing of a dental, medical, or industrial device. These means to affix the base to a vertical support surface preferably allow the handpiece holder to be removed for replacement when damaged, and secure it in position not to rotate. To secure the base in position from rotating when mounted, positioning structure, such as pins or rods are affixed to the bottom of the base, and sized to fit within corresponding holes in the vertical support surface.

A rotatable disc is rotatably attached to the base with a spring biased stop to releaseably secure the rotatable disc in a desired rotational position, which allows repositioning of the rotatable disc by applying sufficient force to overcome the spring bias of the stop until the desired angle of rotation is achieved. A U shaped holder with an opening structured to removably hold handpieces is then affixed to the rotatable disc for positioning at a desired angle or rotation.

Preferred means to affix the base to the vertical support surface comprise a U shaped holder with a post having a post end adapted with flexible mechanical fingers sized to fit within a hole in the base in communication with a hole in the rotatable disc aligned with a hole in the vertical support surface to removably secure to the inside of the vertical support surface, when the post is inserted. The holder post may be removed by pulling it with sufficient force so that the fingers compress against the edges of the hole of the vertical support surface to release their hold.

Preferred spring biased stops to releaseably secure the rotatable disc in a desired position on the base comprise a spring biased stop ratchet system, such as a spring biased pawl, spring biased ball bearings, etc., which have a biased stop end to selectively engage a toothed circumferential gear track to hold the rotatable disc in a given position until addition sufficient force is applied to overcome the spring bias, allowing the rotatable disc to be repositioned and held at a new desired angle of rotation.

In one embodiment, the base has a perimeter with a plurality of spring biased pawls spaced there around. A rotatable disc structured as a disc housing is then rotatably secured surrounding the base perimeter. The rotatable disc housing has an interior circumferential geared track, which is engaged by the plurality of spring biased pawls when the housing is positioned surrounding the base perimeter. The spring biased pawls releaseably hold the rotatable disc housing in a desired rotational position. The rotational position may be change by applying sufficient force to overcome the spring bias of the pawls allowing the rotatable disc to rotate for securing in another position.

One construction to rotatably secure the rotatable disc housing surrounding the base has a rotatable disc housing with a center hole, which is rotatably attached to the base by a post attached to the U shaped holder. The end of the post of the U shaped holder has similar compressible expandable mechanical fingers, described above, which when passed through aligned holes in the rotatable disc housing and base and a hole in the vertical support surface holds the rotatable handpiece holder onto the interior segment of the vertical support surface to removably secure the rotatable handpiece holder to the vertical support surface.

In another preferred embodiment, the rotatable disc housing and base ratcheting mechanism is reversed. In this embodiment the removable rotatable handpiece holder has a base with a gear toothed perimeter forming surrounding a center hole. The rotatable disc housing has a plurality of spring biased pawls along its interior walls structured to align with the base gear toothed perimeter via a corresponding center hole. The rotatable disc housing and base are then secured in place via a post placed within the aligned center holes. When positioned the rotatable disc housing spring biased pawls releaseably hold onto the base gear toothed perimeter to removably secure the rotatable disc housing in a desired position until sufficient force is applied to overcome the spring biased pawls allowing the disc housing to be rotatably repositioned.

The spring biased stop thus allows the rotatable disc housing to be secured to the vertical support surface at various rotational angles.

Affixed to the rotatable disc is a U shaped holder with an opening structured to removably hold handpieces placed thereon. The U shaped holder in one embodiment has a post with one end attached to the holder and the other end structured with expandable mechanical fingers. The post is structured to pass through the rotatable disc center hole and base center hole to allow the rotatable disc to rotate. The expandable mechanical fingers of the post extend through a hole in the vertical support surface and removably secure thereto the base of the rotatable handpiece holder by expanding to grip the interior wall surrounding the hole of the vertical support surface, when inserted.

The invention thus provides a handpiece holder, which removably secures to a vertical support surface to. This provides easy access to medical, dental, or industrial handpieces, and is replaceable and rotatable to hold handpieces in different positions on the vertical support surface.

DESCRIPTION OF THE ILLUSTRATED EMBODIMENTS

Figure 1:
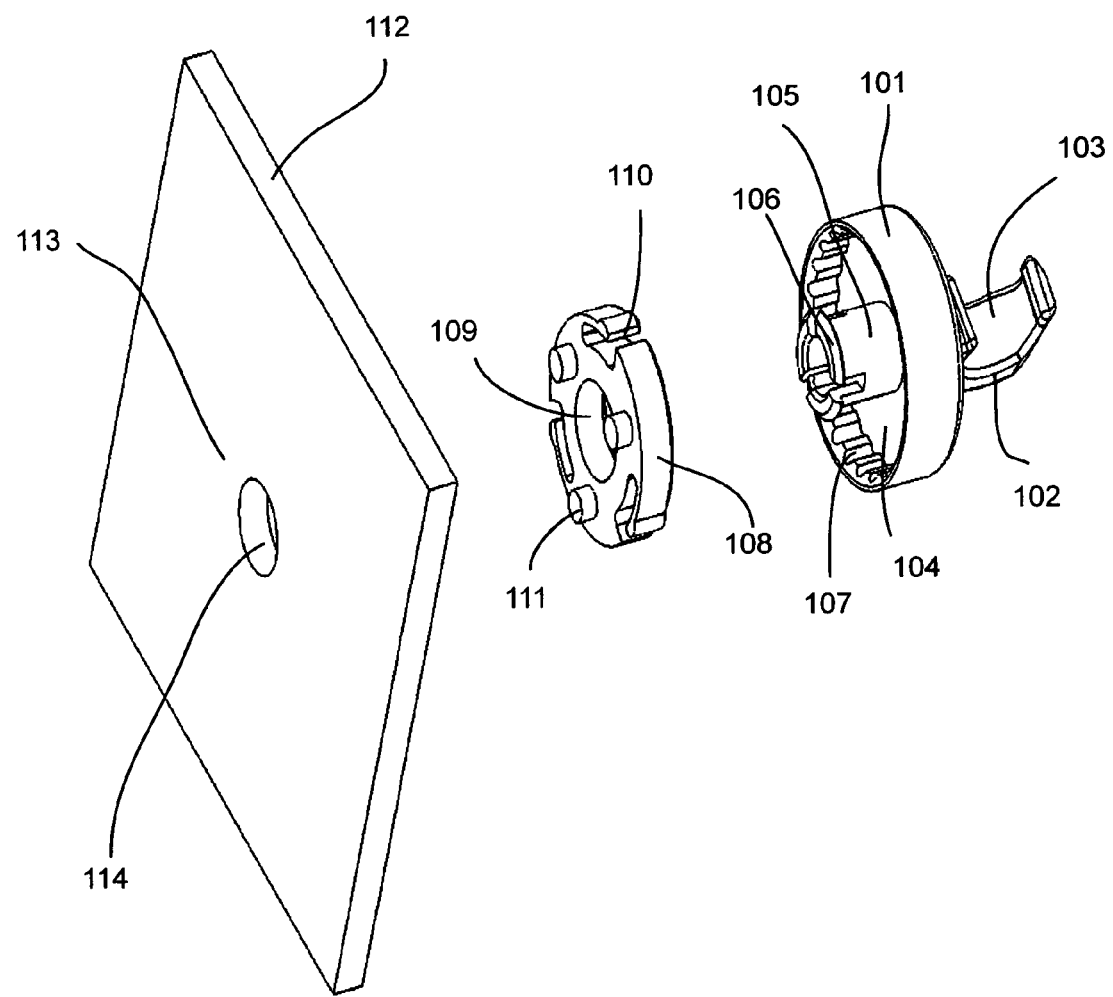
FIG. 1 is an exploded view of one preferred embodiment.

FIG. 1 is an exploded view of one preferred embodiment of the handpiece holder 101 structured as a rotatable housing. Attached to the handpiece holder 101 is a U shape clip 102 with an opening 103 structured to removably hold handpieces placed thereon.

Inside handpiece holder 101 rotatable housing, is an interior opening 104. A center post 105 is attached to an interior wall of handpiece holder 101. At end of center post 105, are compressible mechanical fingers 106 structured to expand and grip the interior surface surrounding a hole 114 in the vertical support surface 112. There is a circumferential gear toothed perimeter 107 inside interior wall of handpiece holder 101.

A disc base 108 is structured to fit into space of the interior opening 104 of handpiece holder 101. A through hole 109 in the center of disc base 108 allows center post 105 of the handpiece holder 101 to pass there through. There are three mechanical pawls 110 along the perimeter of the disc base 108 structured to ratchet along the gear toothed perimeter 107 of the interior wall of handpiece holder 101, when assembled.

Three mini posts 111 attached to the disc base 108 are used to securely position the disc base 108 onto a vertical support surface such as a housing or a wall 112. These three mini posts 111 fit within three corresponding open holes 113 (not shown in the drawing) in the wall 112. Thus, when the post 105 passes through a through hole 114, it secures the disc base 108 via the post 105 and mini posts 111 to the vertical support surface so that the base 108 doesn't rotate.

Figure 2:
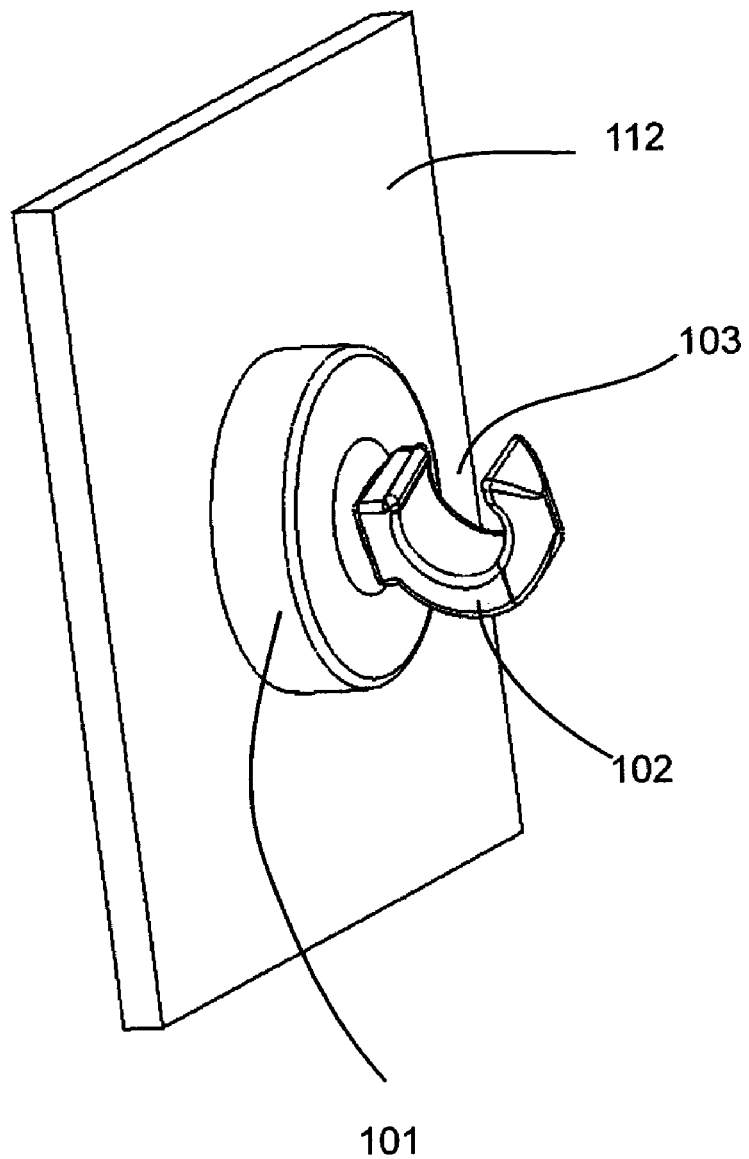
FIG. 2 is an assembled view of the embodiment of FIG. 1.

FIG. 2 depicts the front assembled view of handpiece holder 101 shown in FIG. 1.

Figure 3:
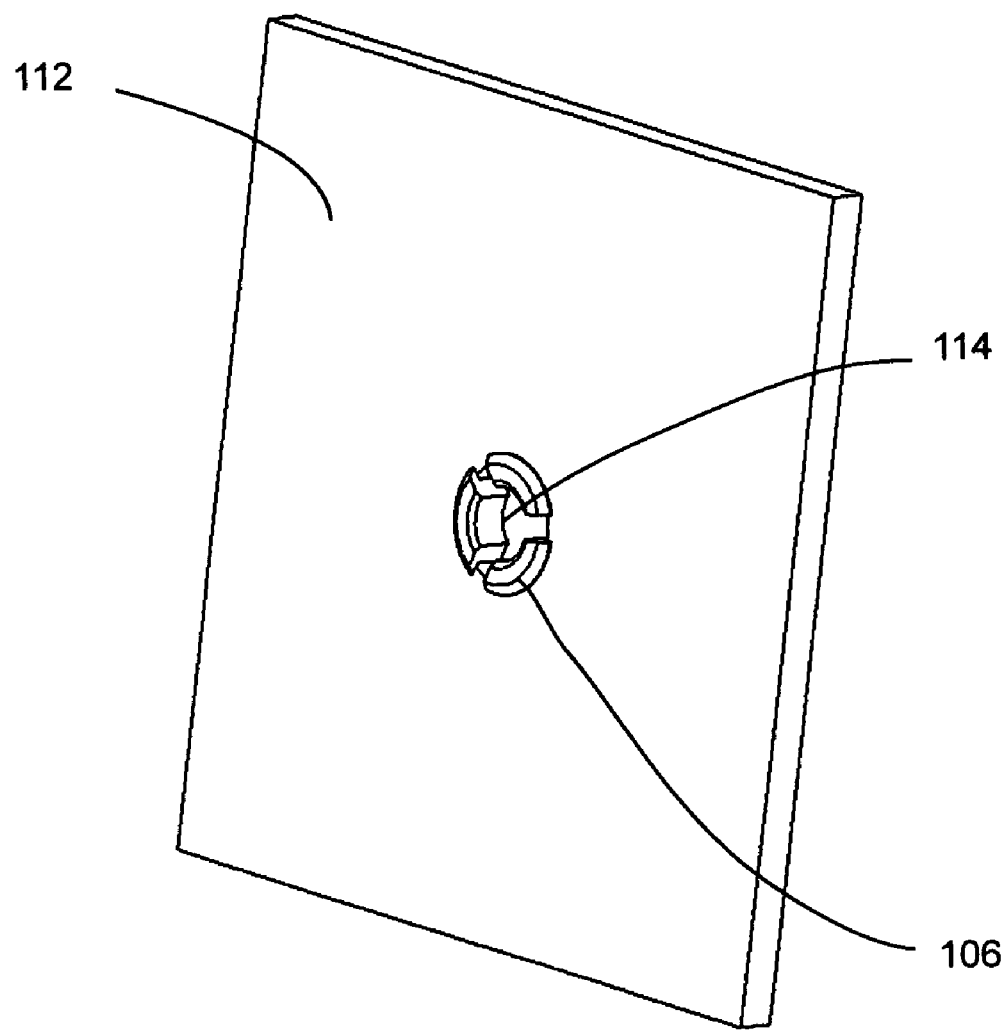
FIG. 3 is a back view of the embodiment of FIG. 1 secured to a vertical support surface.

FIG. 3 depicts the back view of the support surface 112, showing the mechanical fingers 106 of the handpiece holder 101 secured to the inside vertical support surface defining the center hole 114. From these figures, it can be seen that the handpiece holder 101 can be rotated to any position desired. The handpiece holder 101 can also be removed when pulled with sufficient force in the direction vertical to the housing or wall to release the mechanical fingers 106.

Although this description has referred to the illustrated embodiments, it is not intended to restrict the scope of the claims. The claims themselves recite those features deemed essential to the invention.

We claim:

1. A removable, rotatable handpiece holder comprising:
   a. disc base with a plurality of spring biased pawls along its exterior perimeter, a center hole, and positioning structure to prevent the disc base from rotating when mounted on a vertical support surface,
   b. a rotatable disc housing with a center hole aligned with the center hole of the disc base and defining an interior having gear toothed interior perimeter, which are releaseably held by the spring biased pawls of the disc base to removably secure the rotatable disc in a desired position until sufficient force is applied to overcome the spring biased pawls allowing the rotatable disc to be repositioned in a three-hundred and sixty degree range, and
   c. a U shaped holder with an opening structured to removably hold handpieces placed thereon, the holder having an end with expandable mechanical fingers sized to fit within the aligned center holes and extend and pass through a hole in the vertical support surface, when the mechanical fingers are compressed allowing the post end to pass through the hole in the vertical support surface, until the mechanical fingers are free to expand to grip an interior segment of the vertical support surface to removably secure the rotatable handpiece holder to the vertical support surface.

2. A holder for handpiece devices, comprising:
   a disc base having a perimeter and a face, comprising:
      a through-hole positioned on the center axis of the disc base; and
      a plurality of biased pawls positioned on the perimeter of the disc base; and
   a handpiece holder, comprising:
      a clip;
      a housing attached to the clip, the housing having an interior opening; and
      a gear tooth perimeter lining the perimeter of the interior opening of the housing, the plurality of biased pawls interfacing with the gear tooth perimeter providing a three-hundred and sixty degree range of rotation of the handpiece holder with respect to the disc base, the biased pawls engaging with the gear tooth perimeter to selectively secure the housing in a desired rotational position within the three-hundred and sixty degree range.

3. The holder for handpiece devices recited in claim 2, the handpiece holder further comprising a center post having a first end and a second end, the first end connected to the housing within the interior opening and extending through the through-hole of the disc base.

4. The holder for handpiece devices recited in claim 3, the center post further comprising mechanical fingers on the second end of the center post, the mechanical fingers interfacing with a support structure to rotationally and releaseably secure the handpiece holder to the support structure.

5. The holder for handpiece devices recited in claim 4, the disc base further comprising positioning structure extending from the face of the disc base and interfacing with the support structure to rotationally fix the disc base to the support structure.

6. The holder for handpiece devices recited in claim 5, the support structure further comprising an open hole, and the positioning structure comprising a post that interfaces with the open hole.

* * * * *